July 22, 1952  P. G. EXLINE  2,604,163
TEMPERATURE-COMPENSATED VISCOUS TIMING DEVICE
Filed June 23, 1948  2 SHEETS—SHEET 1
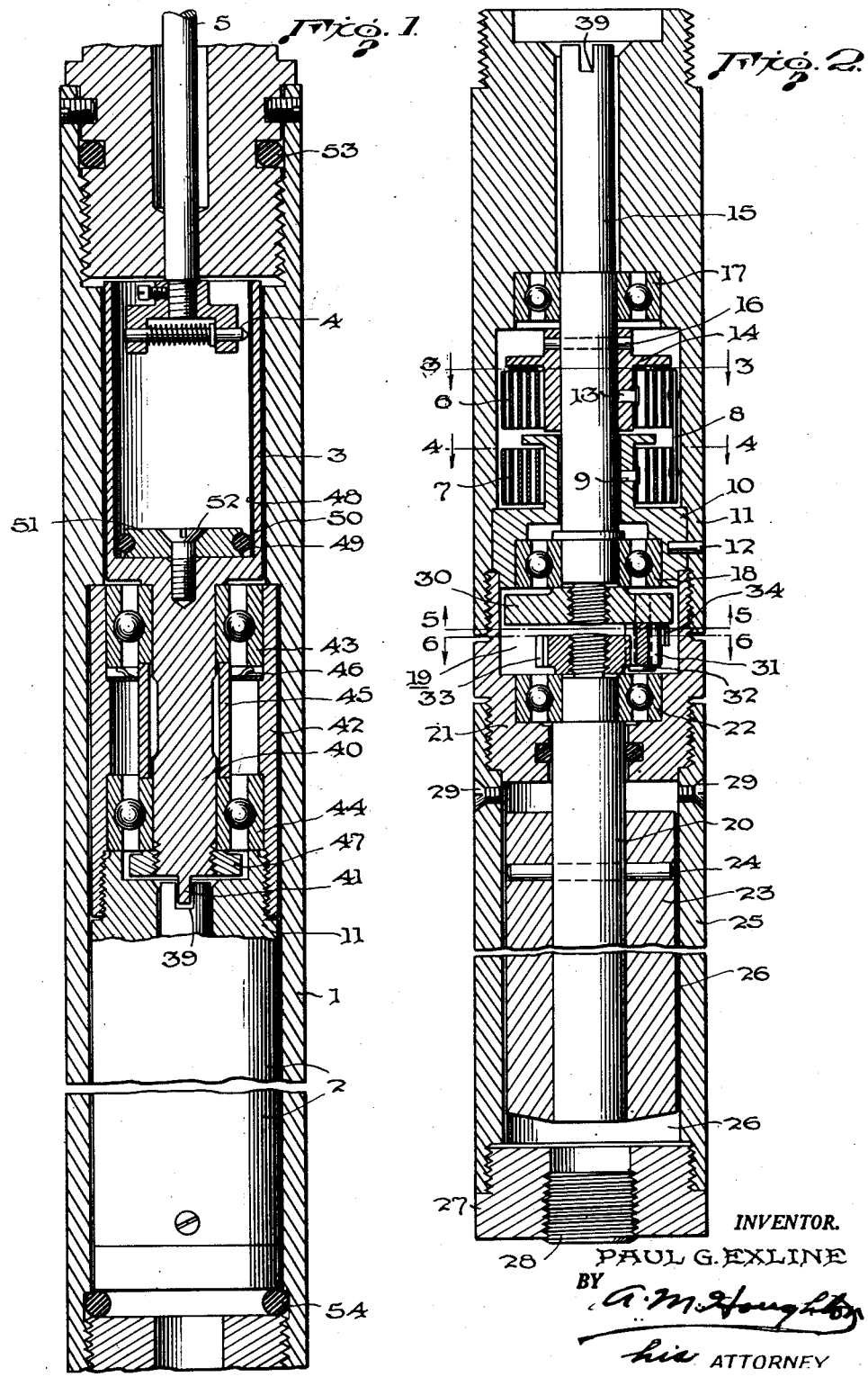
INVENTOR.
PAUL G. EXLINE
BY
his ATTORNEY

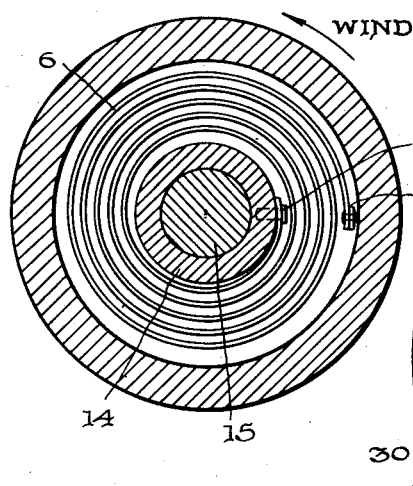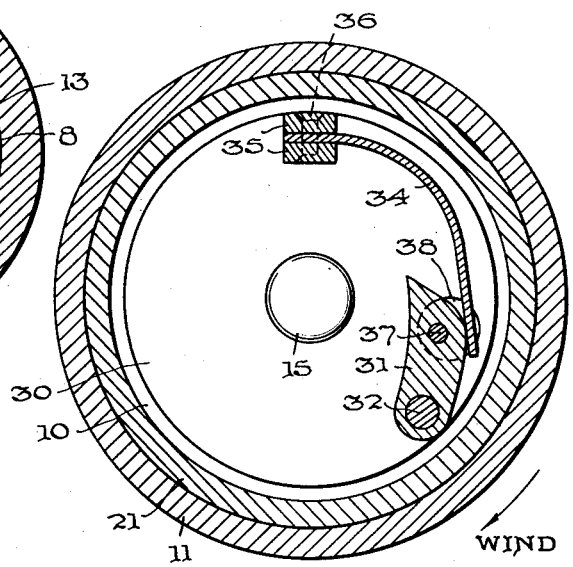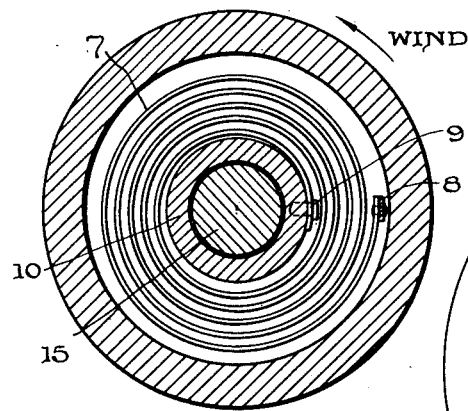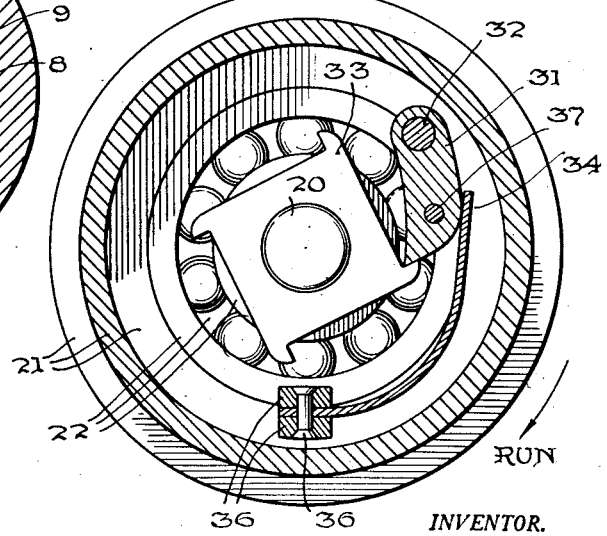

Patented July 22, 1952

2,604,163

UNITED STATES PATENT OFFICE 2,604,163

TEMPERATURE-COMPENSATED VISCOUS TIMING DEVICE

Paul G. Exline, Tulsa, Okla., assignor to Gulf Research & Development Company, Pittsburgh, Pa., a corporation of Delaware Application June 23, 1948, Serial No. 34,742

6 Claims. (Cl. 161—15)

This invention relates to a device for regulating the angular velocity of a rotating member, and more particularly to a device of the character described which is advantageously adapted to perform the function of a timing element for such apparatus as chart drums and the like.

The selection of a suitable timing device for various industrial purposes is often quite difficult. In the past it has frequently been necessary to sacrifice accuracy for ruggedness, or else utilize a delicate type of mechanism and simply become resolved to make frequent repairs and replacements. In the case of timing devices for chart drums of bottom hole pressure recorders such as are used in the petroleum industry, this difficulty is particularly prevalent. These pressure recorders are generally comprised of a timing element which operates a chart drum, and a pressure responsive device which is adapted to record pressure indications on a chart carried by the drum. Such instruments are almost inevitably subjected to shock, vibrations and radical temperature changes. Under this treatment, conventional clocks and watches have proved to be quite unsatisfactory due to the delicate nature of their mechanisms. Electrical timing mechanisms, on the other hand, are meritorious under such conditions, but the scarcity of electrical conduits in the field and the hazards presented thereby preclude any wide application of electrical timing elements.

It is known to control the speed of rotating bodies by viscous dampening devices, but such a procedure is not at all satisfactory when the system is subjected to wide temperature variations due to the large changes in viscosity of most liquids with small temperature changes.

The primary object accomplished by my invention is to provide a timing device utilizing the viscous dampening principle wherein the resistance to shear of a viscous liquid constitutes the regulating agency, but of such a construction and arrangement of parts that changes in the viscosity of the liquid incident to temperature variations are substantially corrected for.

Another object accomplished by my invention is the provision of a device for regulating the angular velocity of a rotating member.

A further object accomplished by my invention is the provision of a timing device having a minimum number of moving parts and of simple, rugged construction, yet sufficiently accurate to find wide utility.

Another object accomplished by my invention is the provision of a timing element for the chart drum of a bottom hole pressure recorder such as is used in reservoir engineering measurements.

A still further object is to provide a device of the character described which is unaffected by normal temperature variations incident to operation.

Other objects appear hereinafter.

My invention utilizes a pair of concentric cylinders, one being rotatable with respect to the other, and having a viscous fluid therebetween to regulate, by means of the resistance to shear offered by the viscous fluid, the angular velocity of a rotating member motivated by a substantially constant torque and having a driving connection with said rotatable cylinder. It is the essence of my invention to construct these concentric cylinders of materials having different coefficients of thermal expansion to compensate for changes in the viscosity and resistance to shear of the viscous fluid incident to temperature variations.

The preferred embodiment of my invention described herein is characterized by an inner cylinder rotatable with respect to an outer cylinder, but it is to be understood that with slight modification the outer cylinder may be made rotatable with respect to the inner cylinder to produce advantageous results.

The rate of rotation of a cylinder rotating within another cylinder containing a fluid is represented by the following equation:

$$N = \frac{CT}{\pi^2 \mu D^3 L} \quad (1)$$

in which $N$ = velocity of rotation (revolutions per minute time).
$C$ = diametral clearance between the inner diameter of outer cylinder and outer diameter of inner cylinder.
$\mu$ = viscosity of fluid in the clearance space.
$D$ = diameter of the rotating cylinder.
$L$ = length of the rotating cylinder.
$T$ = torque applied to the rotating cylinder.

It can be seen from Equation 1 that if the dimensions of the cylinders and the torque applied remain constant, the velocity of rotation of the inner cylinder will be inversely proportional to $\mu$, the viscosity. But viscosity will vary with changes in temperature, and in the case of mineral oils, this variation is pronounced. Obviously then, changes in temperature tend to produce changes in the forces restraining the rotation of the inner cylinder, and consequently, affect the angular velocity thereof. However, I have found that it is possible to control changes in C of the above equation to compensate for changes in $\mu$ with temperature, so that the angular velocity of the inner cylinder will remain substantially constant. Let $\mu_1$ and $C_1$ be their respective values at temperature $t_1$, and $\mu_2$ and $C_2$ their values at a higher temperature $t_2$. For the speed of rotation to be the same at the two temperatures, the following conditions must hold:

$$\frac{C_1 T}{\pi^2 \mu_1 D^3 L} = \frac{C_2 T}{\pi^2 \mu_2 D^3 L} \qquad (2)$$

or $$\frac{C_1}{\mu_1} = \frac{C_2}{\mu_2} \qquad (3)$$

If $\alpha$ is the coefficient of thermal expansion of the material of which the outer cylinder is made, and $\beta$ that of the inner cylinder material, $$D_2 = D_1[1 + \alpha(t_2 - t_1)] \qquad (4)$$

and $$d_2 = d_1[1 + \beta(t_2 - t_1)] \qquad (5)$$

in which
$D_1$ and $D_2$ = the inside diameters of the outer cylinder at temperatures $t_1$ and $t_2$.
$d_1$ and $d_2$ = the outside diameters of the inner cylinder at temperatures $t_1$ and $t_2$.

By definition, $$D_2 - d_2 = C_2 \qquad (6)$$

and $$D_1 - d_1 = C_1 \qquad (7)$$

Subtracting Equation 5 from Equation 4 gives:

$$D_2 - d_2 = D_1 - d_1 + D_1 \alpha(t_2 - t_1) - d_1 \beta(t_2 - t_1)$$

or $$C_2 = C_1 + D_1 \alpha(t_2 - t_1) - d_1 \beta(t_2 - t_1)$$

which, by adding and subtracting $$C_1 \alpha(t_2 - t_1)$$

becomes $$C_2 - C_1 = D_1 \alpha(t_2 - t_1) - C_1 \alpha(t_2 - t_1) - d_1 \beta(t_2 - t_1) + C_1 \alpha(t_2 - t_1)$$

or $$C_2 - C_1 = (D_1 - C_1) \alpha(t_2 - t_1) - d_1 \beta(t_2 - t_1) + C_1 \alpha(t_2 - t_1)$$

which, substituting from Equation 7 becomes $$C_2 - C_1 = d_1 \alpha(t_2 - t_1) - d_1 \beta(t_2 - t_1) + C_1 \alpha(t_2 - t_1)$$

or $$C_2 - C_1 = (t_2 - t_1)[d_1(\alpha - \beta) + C_1 \alpha]$$

or $$\alpha - \beta = \frac{(C_2 - C_1)}{d_1(t_2 - t_1)} - \frac{C_1 \alpha}{d_1} \qquad (8)$$

Substituting from Equation 3 for $C_2$ gives $$\left(1 + \frac{C_1}{d_1}\right)\alpha - \beta = \frac{C_1 \left[\frac{\mu_2}{\mu_1} - 1\right]}{d_1(t_2 - t_1)} \qquad (9)$$

The term $$\frac{C_1}{d_1}$$

is small enough compared to unity so that it can be neglected for practical purposes, enabling the equation to be written, with a change of signs, as $$\beta - \alpha = \frac{C_1 \left[1 - \frac{\mu_2}{\mu_1}\right]}{d_1(t_2 - t_1)} \qquad (10)$$

It is possible, by means of Equation 10, to choose materials of construction which will automatically compensate for thermal viscosity changes. For example, suppose a one in. diameter cylinder is operating in another cylinder with a diametral clearance of 0.001 in. at 100° F., and that the range of operation extends from 100° F. to 210° F. Suppose further, that the fluid contained between the cylinders has a viscosity at 100° F. which is twenty-three times its value at 210° F. To maintain the same velocity of rotation of the inner cylinder at 210° F. that it has at 100° F., Equation 10 must be satisfied. Since $$\frac{\mu_2}{\mu_1} = 0.0435$$

$t_2 - t_1 = 110°$ F., $d_1 = 1$ in., $C_1 = 0.001$ in., then by solving Equation 10, $\beta - \alpha = 8.69 \times 10^{-6}/°$ F. The correct combination of materials could be secured in several ways. Table I below is illustrative of a number of combinations of metals which could advantageously be used in accordance with the above example to give a difference in thermal coefficients of expansion $(\beta - \alpha)$ equal to $8.69 \times 10^{-6}/°$ F.

*Table I*

| Combination | Inner Cylinder | | Outer Cylinder | |
|---|---|---|---|---|
| | Metal | $\beta$ | Metal | $\alpha$ |
| 1 | Indium | $23.17 \times 10^{-6}/°$ F | Magnesium | $14.48 \times 10^{-6}/°$ F. |
| 2 | Aluminum 2S | $13.81 \times 10^{-6}/°$ F | Illium R | $5.12 \times 10^{-6}/°$ F. |
| 3 | Solder 60-40 | $12.25 \times 10^{-6}/°$ F | Tantalum | $3.57 \times 10^{-6}/°$ F. |
| 4 | Lead | $16.39 \times 10^{-6}/°$ F | Monel | $7.70 \times 10^{-6}/°$ F. |
| 5 | Dow Metal | $16.10 \times 10^{-6}/°$ F | Nickel | $7.41 \times 10^{-6}/°$ F. |
| 6 | Magnesium | $14.48 \times 10^{-6}/°$ F | Stainless Steel (Type 446) | $5.79 \times 10^{-6}/°$ F. |
| 7 | Beryllium Copper | $9.39 \times 10^{-6}/°$ F | Invar | $.01 \times 10^{-6}/°$ F. |

In practice, it is desirable to use a hydraulic fluid whose viscosity variations with temperature are at a minimum. For this reason, the silicone liquids, or more specifically, certain organo silicon oxide liquid polymers, may advantageously be used.

My invention is further illustrated by the accompanying drawings and the description relating thereto wherein I provide a timing element of the character described which is adapted to operate the chart drum of a bottom hole pressure recorder. Referring to the drawings:

Fig. 1 is a longitudinal view, partly in section, showing the portion of a pressure recorder housing a recording instrumentality, a chart drum and a timing device therefor.

Fig. 2 is a longitudinal view in section of a timing element for the recorder shown in Fig. 1.

Fig. 3 is a transverse sectional view taken along the line 3—3 of Fig. 2.

Fig. 4 is a transverse sectional view taken along the line 4—4 of Fig. 2.

Fig. 5 is a transverse sectional view taken along the line 5—5 of Fig. 2.

Fig. 6 is a transverse sectional view taken along the line 6—6 of Fig. 2.

Fig. 7 is a longitudinal view in section of a part of the chart drum and shaft therefor.

Referring to Figs. 1 and 2, 1 is the casing of the bottom hole pressure recorder in which are situated a motor or timing element generally indicated at 2 and shown in detail in Fig. 2, a chart drum 3 operatively connected thereto, and a stylus 4 in engagement with chart drum 3 and operated by means of push rod 5 which in turn is motivated by a pressure responsive means not shown.

The power for the timing element shown in detail in Fig. 2 is obtained from a pair of springs 6 and 7 arranged in tandem and connected by a link 8. Sectional views taken through the timing element along lines 3—3 and 4—4 show in Figs. 3 and 4 plan views of springs 6 and 7, respectively. One end of spring 7 is fixed by a rivet 9 to a collar 10 which in turn is fixed to a casing 11 by means of pin 12. Similarly, one end of spring 6 is fastened by means of rivet 13 to a collar 14 which is adapted to accommodate spring 6. Collar 14 is in fixed relation to a shaft 15, having been provided with a tapered pin 16 extending through both collar and shaft. Shaft 15 lies in rotatable relation to casing 11, being journaled by means of bearing 17 accommodated by casing 11 and bearing 18 accommodated by collar 10 which is in fixed relation to casing 11. Thus, when springs 6 and 7 have been wound and released, the resulting force is applied to shaft 15 causing rotation thereof. However, shaft 15 is operatively connected through a clutch mechanism generally indicated at 19 to another shaft 20, the rotation of which is restrained by means of a viscous dampening device. Shaft 20 is rotatably journaled in a clutch housing 21 by means of bearing 22. To restrain the rotation of shaft 20, a cylinder 23 is affixed thereto by pin 24, and an outer cylinder 25 is provided in close spatial relationship with cylinder 23 to accommodate a hydraulic medium 26 designed to offer resistance to the rotation of cylinder 23 when said hydraulic medium is in shear. Cylinders 23 and 25 are constructed of materials having different coefficients of thermal expansion, to compensate for changes in the viscosity of the hydraulic fluid 26 incidental to temperature variations. The outer cylinder 25 is capped at one end by a cap 27 and connected to clutch housing 21 at its other end. Cap 27 is provided with a plug 28 to facilitate filling with the hydraulic medium, and similarly, outer cylinder 25 is provided with removable screws 29 to vent any trapped air while filling the device with fluid.

Referring to Figs. 2, 5 and 6, the clutch mechanism generally indicated at 19 is made up of a rotatable disc 30 attached to shaft 15, a pawl 31 pivoted on pin 32 from disc 30, and a ratchet 33 in operative engagement with pawl 31 and attached to rotatable shaft 20. Engagement of pawl 31 with ratchet 33 is accomplished by means of spring 34 which is secured to lugs 35 by means of rivet 36, the lugs 35 being attached to disc 30. Pawl 31 is further provided with a pin 37 extending into a hole 38 in disc 30 to limit the movement of the pawl. The construction and arrangement of the clutch parts are such that springs 6 and 7 may be wound by rotating shaft 15 without substantially rotating shaft 20 and cylinder 23, since pawl 31 will simply slide over ratchet 33, the ratchet being restrained from movement by the viscous dampening mechanism. However, when springs 6 and 7 are permitted to unwind, thereby rotating shaft 15, pawl 31 operatively engages the teeth of ratchet 33 so that the rotation of shaft 15 is restrained by the hydraulic medium 26 between cylinders 23 and 25.

Shaft 15 is provided with a keyway 39 to adapt it for transmitting power, in the embodiment being described, to deliver power to drive a recorder chart drum 3. This chart drum is provided with a shaft 40 which is keyed to shaft 15 by key 41. A bearing housing 42 is connected to casing 11 of the timing element and is fitted integrally therewith into casing 1 of the pressure recorder. This bearing housing 42 is provided with two ball bearings 43 and 44 to accommodate chart drum shaft 40 and make it rotatable. These bearings are spaced apart by a cylinder 45 surrounding shaft 40. Bearing 43 is further constrained by a spring 46, and bearing 44 is in turn further constrained by a collar 47 fixed to the end of shaft 40, which collar acts as a bearing retainer.

Referring to Figs. 1 and 7, the inner periphery of chart drum 3 is adapted to accommodate a recording medium 48, advantageously aluminum foil. A portion of the inside of chart drum 3, generally indicated at 49, is knurled and the pressure of an "O" ring 50 forcing the aluminum foil 48 against the knurled section 49 serves to secure the foil within the chart drum for recording purposes. The pressure causing ring 50 to expand results from the expansion of an expanding base plate 51, which in turn is expanded by tightening flat head screw 52.

The timing element and recording drum are completely sealed off from the outside of the bottom hole pressure recorder by means of gaskets 53 and 54.

The operation of the bottom hole pressure recorder is as follows:

The casing 1 of the recorder is broken down exposing chart drum 3. This drum is rotated in such a direction and for a period of time sufficient that springs 6 and 7 become wound. It is to be noted that this winding operation is substantially unaffected by the cylinders 23 and 25 due to the operation of clutch 19. After winding, the device is again completely assembled, whereupon springs 6 and 7 begin to unwind, but under the restraining influence of cylinder 23 shearing viscous fluid 26 within cylinder 25. While this is taking place the entire instrument may be lowered into a hole, such as a well bore, to obtain pressure indications at various depths.

The embodiment described hereinabove may be variously modified without departing from the spirit and scope of my invention. For example, a latching mechanism may be provided to prevent springs 6 and 7 from unwinding until after a predetermined time. The mechanism might be unlatched by jerking the line from which the pressure recorder is suspended or by other means well known to those skilled in the art. Furthermore, a gear train may be provided between the chart drum 3 and the clutch mechanism 19 to reduce the torque on rotating cylinder 23 and thereby increase the time per revolution of the chart drum. In addition, instead of using shaft 15 for timing purposes, shaft 20 could be extended to perform the same function, and springs 6 and 7 could be wound by other means.

My invention is particularly advantageous in that it succeeds in providing a timing device having a minimum number of moving parts, simplicity and ruggedness of construction, and which lends itself to economic manufacture, while at the same time providing a timing device which is capable of useful operation over a wide range of temperatures. It finds application wherever a rugged timing element is desirable. For example, it may be used for closing a contact or tripping a trigger at the end of a predetermined time. In this connection, it may be used for tripping the trigger of a bottom hole sampler, or for completing the contact in an explosive bomb at the end of a predetermined time. My invention finds further application as a torsional vibration dampener wherein I provide a cylindrical inertia member enclosed in a cylindrical housing attached to the part requiring damping. The space between the inertia member and the housing is filled with the damping fluid, and both cylindrical members are constructed of materials having different coefficients of thermal expansion in accordance with the principles outlined hereinabove.

It is understood that the embodiments disclosed herein specifically are intended to be illustrative only, and that my invention is to be limited only by the scope of the appended claims hereinafter made. In the appended claims, when I speak of an inner cylinder I intend to include both hollow and solid bodies and to include what is commonly called a piston.

What I claim is:

1. A timing device comprising an outer cylinder, a spaced inner cylinder concentric therewith and rotatable with respect thereto, both of said cylinders being constructed of materials having different coefficients of thermal expansion such that the spacing between them diminishes with rise in temperature, a spring having a driving connection with said inner cylinder, a viscous liquid medium filling the space and effective over the entire opposed areas of the cylinders to restrain the rotation of said inner cylinder, and means operatively connected to said inner cylinder to form a timing instrumentality which rotates at a substantially constant speed.

2. A timing element for chart drums comprising a pair of concentric cylinders, the inner cylinder being rotatable with respect to the outer cylinder and spaced therefrom to define a narrow annular space between the opposed surfaces of said cylinders, a rotatable shaft connected to said inner cylinder, means for applying a substantially constant torque to said shaft, a hyraulic liquid filling the space between the two cylinders to retard the rotation of said inner cylinder by reason of the viscosity of said fluid, both of said cylinders being constructed of materials having different coefficients of thermal expansion such that their spacing diminishes with rise in temperature and increases with temperature drop to compensate for changes in the shear resistance of said hydraulic liquid incident to temperature variations.

3. In a timing device characterized by a rotating member motivated by a substantially constant torque, means for restraining the rotation of said member to maintain the angular velocity thereof substantially constant over a range of temperatures comprising a pair of concentric cylinders, the inner cylinder being rotatable with respect to the outer cylinder and operatively connected to said rotating member, a hydraulic medium between said cylinders to restrain the rotation of said inner cylinder, said concentric cylinders being constructed of materials having different coefficients of thermal expansion such that the difference between said coefficients of thermal expansion, $\beta - \alpha$, is equivalent to the following relationship:

$$\beta - \alpha = \frac{C_1 \left[ 1 - \frac{\mu_2}{\mu_1} \right]}{d_1(t_2 - t_1)}$$

in which $\beta$ = coefficient of thermal expansion of the inner cylinder.

$\alpha$ = coefficient of thermal expansion of the outer cylinder.

$t_2$ = highest temperature to which the system is subjected.

$t_1$ = lowest temperature to which the system is subjected.

$\mu_1$ = viscosity of the hydraulic medium at temperature $t_1$.

$\mu_2$ = viscosity of the hydraulic medium at temperature $t_2$.

$d_1$ = outside diameter of the inner cylinder at temperature $t_1$.

$C_1$ = diametral clearance between the inner diameter of the outer cylinder and the outer diameter of the inner cylinder at temperature $t_1$.

4. A viscous timing device for driving a chart drum or the like at a constant velocity, said device comprising a movable member connected to a means for unidirectionally driving the same, a stationary member closely spaced therefrom and defining therewith surfaces of large area opposed to each other, a viscous fluid in the space between said movable and stationary members retarding motion of said movable member by reason of its viscosity, the said movable and stationary members being of different coefficients of expansion whereby their spatial relationship is altered by temperature changes in such manner as to compensate for variations in viscosity of said fluid caused by temperature changes, thereby to produce a substantially constant retarding effect upon said movable member and to cause it to be driven at a constant velocity.

5. A viscous timing device for driving a chart drum or the like at a constant angular velocity, said device comprising outer and inner cylinders having a small clearance therebetween, means for unidirectionally rotating one of said cylinders with respect to the other, a viscous liquid in the clearance between said cylinders retarding the rotation of one relative to the other, the inner cylinder having a larger coefficient of expansion than the outer one such as to decrease the liquid-filled clearance between them with rise in temperature and so to maintain a substantially unvarying resistance to rotation of the one cylinder notwithstanding a decrease in viscosity of the intervening fluid due to such rise in temperature, whereby the movable cylinder will be rotated at constant angular velocity under constantly applied torque, regardless of temperature changes.

6. A timing device comprising an outer cylinder, an inner cylinder concentric therewith and rotatable with respect thereto, both of said cylinders being constructed of materials having different coefficients of thermal expansion such that the spacing between them diminishes with rise in temperature and change in viscosity of a contained fluid, means for rotating said inner cylinder, a fluid medium filling the space between the cylinders to restrain the rotation of said inner cylinder, and means operatively connecting with said inner cylinder to form a timing instrumentality which rotates at a substantially constant speed.

PAUL G. EXLINE.

REFERENCES CITED

The following references are of record in the file of this patent:

UNITED STATES PATENTS

| Number | Name | Date |
|---|---|---|
| 1,407,320 | Bouche | Feb. 21, 1922 |
| 1,955,855 | Marx | Apr. 24, 1934 |
| 2,078,623 | Wilde, Jr. | Apr. 27, 1937 |
| 2,234,437 | Kistler | Mar. 11, 1941 |
| 2,265,098 | Bettis | Dec. 2, 1941 |
| 2,417,282 | Wheeler | Mar. 11, 1947 |